United States Patent [19]

Pietsch et al.

[11] Patent Number: 4,824,823

[45] Date of Patent: Apr. 25, 1989

[54] MICROCAPSULES CONTAINING OILS AND SOLUBLE COLOR REACTION COMPONENTS, THEIR MANUFACTURE AND USE IN COLOR REACTION RECORDING SYSTEMS

[75] Inventors: Gunter Pietsch, Isernhagen; Karl-Heinz Schrader, Hanover, both of Fed. Rep. of Germany

[73] Assignee: Papierfabrik August Koehler AG, Fed. Rep. of Germany

[21] Appl. No.: 922,591

[22] Filed: Oct. 24, 1986

[51] Int. Cl.$^4$ .................... B01J 13/02; B41M 5/16; B41M 5/22

[52] U.S. Cl. .................... 503/201; 264/4.7; 428/402.21; 428/914; 503/214; 503/215

[58] Field of Search .................... 264/4.7; 428/402.21; 346/215; 503/215, 201

[56] References Cited

U.S. PATENT DOCUMENTS 4,369,670 8/1983 Sinclair .................... 264/4.7 X
4,525,520 6/1985 Shioi et al. .................... 428/402.21 X

OTHER PUBLICATIONS

"Flow Measurement", Kirk–Other Concise Encyclopedia of Chemical Technology, 1985, p. 496.

*Primary Examiner*—Richard D. Lovering
*Attorney, Agent, or Firm*—Darby & Darby

[57] ABSTRACT

A process for microencapsulating hydrophobic oils with color reactants, dissolved therein, of color reaction systems by reacting a water-soluble non-ionic melamine/formaldehyde precondensate and a water-soluble polymer in an oil-in-water dispersion for forming the capsule envelope is described. The special feature of this process is that, for stabilizing the oil-in-water dispersion, an aqueous solution of a cationic melamine/formaldehyde precondensate and the aqueous solution of a water-soluble polymer are mixed with vigorous stirring, a solid precipitating as a very fine suspension in the mixture, the mixture thus obtained and containing the very finely suspended solid is mixed with ther oil, containing the color reactant in solution, with vigorous stirring, the oil-in-water dispersion thus obtained in acidified and an aqueous solution of a water-soluble non-ionic melamine/formaldehyde precondensate is added with stirring, in order to form the capsule envelope. The use of the cationic melamine/formaldehyde precondensate leads to the precipitation of a very finely suspended reaction product thereof, whereby all the reaction systems in the course of the process are stabilized. Excellent capsules can be obtained without formation of agglomerates. The invention also relates to the microcapsules obtainable by the above process and to their advantageous use in color reaction recording systems.

14 Claims, No Drawings

MICROCAPSULES CONTAINING OILS AND SOLUBLE COLOR REACTION COMPONENTS, THEIR MANUFACTURE AND USE IN COLOR REACTION RECORDING SYSTEMS

The invention relates to a process for microencapsulating hydrophobic oils with color reactants, dissolved therein, of color reaction systems by reacting a water-soluble non-ionic melamine/formaldehyde precondensate and a water-soluble polymer in an oil-in-water dispersion to form the capsule envelope, to microcapsules manufactured by the said process and to their use in color reaction recording systems.

Processes of the above type are known. The microcapsules which can be manufactured by this processs and which as a rule contain an oily hydrophobic solution of the color former (a homogenous substance) are in general applied in the usual way to the underside of a paper sheet, the CB sheet. This CB sheet can be in contact with a so-called CF sheet, in which the surface facing the CB sheet is coated with an acidic reactant for the color former. The acidic reactant can, for example, be an acid-treated clay, such as montmorillonite clay, or a low-molecular phenolic resin, such as a phenol/formaldehyde novolak resin. If the acidic reactant is an acidic compound which is soluble in oily hydrophobic liquids, it can also be encapsulated. During the printing process, the said capsules are crushed by the printing types. As a result, the reactants come into mutual contact and produce a colored character on the CF sheet. The two said color reactants can also be applied to the surface of a single sheet, in order to obtain a so-called autogenic system. In this case, it is advisable to encapsulate both reactants if the acidic reactant is soluble in the oil, in order to preclude an undesired premature reaction of the reactants.

There are various encapsulation processes for producing the capsule envelopes of microcapsules intended for reproduction purposes in color reaction systems. These are based, for example, on the use of gelatine coacervate systems, polyisocyanate systems, polyamide systems or aminoplast systems. The process described at the outset is based on an aminoplast system, in which the water-soluble non-ionic melamine/formaldehyde precondensate is reacted with a water-soluble polymer, capable of reaction with the former, to form the capsule envelope. This process has recently gained increasing importance. It is relatively easy to control and proceeds under comparatively mild reaction conditions, so that even very sensitive color formers remain unimpaired in the course of the reaction.

A process of the type mentioned at the outset is described in detail in German Offenlegungsschrift No. 2,652,875. According to this process, the starting materials are a water-soluble urea/formaldehyde precondensate, a water-soluble non-ionic melamine/formaldehyde precondensate and a water-soluble polymer capable of reaction therewith. The polymer is said to play a role in stabilizing the dispersion, due to an interaction with the urea/formaldehyde precondensate. This is a complex reaction system with diverse process parameters which are difficult to control. Satisfactory stabilization of the dispersion is obtained only if the urea/formaldehyde precondensate together with the water-soluble polymer is first introduced in an emulsified system and, after a preliminary reaction, the further reactant is added in the form of the water-soluble melamine/formaldehyde precondensate. German Offenlegungsschrift No. 2,940,786 has disclosed a similar process, the special feature of which is the use of a water-soluble polymer which carries sulfonic acid groups and must be free of phenyl and/or sulfophenyl groups. The stabilization problems already mentioned again arise in this case. Even British Patent No. 1,389,238 is unable to make definite suggestions for overcoming these problems. According to this patent, a liquid reaction system, which contains the starting materials for the capsule envelope and a special surface-active substance obtained from an aminoplast precondensate, is subjected to a spray-drying process. During the latter, the capsule-forming reaction and the evaporation of the liquid phase proceed virtually instantaneously. The conditions of this process cannot be transferred under any aspect to those which are of importance to the abovementioned processes.

The invention was therefore based on the object of further developing the process described at the outset, in such a way that, with optimum stabilization of the dispersion, it can be carried out more simply and more quickly while obtaining a satisfactory microcapsule quality.

According to the invention, this object is achieved by mixing an aqueous solution of a cationic melamine/formaldehyde precondensate and the aqueous solution of a water-soluble polymer with vigorous stirring, a solid precipitating as a very fine suspension in the mixture, vigorously mixing the mixture thus obtained and containing said very finely suspended solid with the oil, containing the color reactant in solution, acidifying the oil-in-water dispersion thus obtained and adding an aqueous solution of a water-soluble non-ionic melamine/formaldehyde precondensate with stirring, in order to form the capsule envelope.

The essence of the process according to the invention consequently comprises the use of two different melamine/formaldehyde precondensates. Their specific differences and functions will be discussed below. The other starting materials and the process parameters can be subject to very wide fluctuations within the scope of the known procedure based on the reaction of melamine/formaldehyde precondensate with polymer. With respect to these generally known process parameters, the description which follows is therefore only intended to outline a preferred procedure.

In theory, the ability of the water-soluble polymer to enter the chemical interaction with melamine/formaldehyde precondensates results from the presence of suitable functional groups, in particular groups carrying Zerewitinoff-active hydrogen atoms, in the polymer. Such functional groups which react with melamine/formaldehyde precondensates are known. These include especially acid, amide, amino, imino, ester, ether, hydroxyl, urethane, thiol or mercaptan groups. Preferred examples of such polymers are polyvinyl alcohol, gelatine and maleic anhydride copolymers, in particular ethylene/maleic anhydride copolymers or styrene/maleic anhydride copolymers. Acrylamide/acrylic acid copolymers, starch, cellulose derivatives such as carboxymethylcellulose (CMC) or hydroxymethylcellulose (HEC), alginates such as sodium alginate, polyurethanes and polyethyl oxide are particularly preferred.

The non-ionic melamine/formaldehyde precondensate must meet various requirements. In the first place, it must be water-soluble. Furthermore, it must be reactive with the Zerewitinoff-active hydrogen atoms of the said water-soluble polymer in an acidic medium. It must also have a reduced reactivity with itself. A reduction in the reactivity can be obtained by at least partial blocking of the active methylol groups. Processes suitable for this purpose are known (cf. Kunststoffhandbuch [Plastics Handbook], volume X, Duroplaste [Thermosetting Resins], page 173). Thus, the desired reactivity of the non-ionic (oligomeric) melamine/formaldehyde precondensate can be adjusted by partial methylation. European Patent Specification No. 0,026,914 describes such a product which contains, for example, 5.25 moles of formaldehyde and 2.3 moles of methyl ether groups per mole of melamine. These requirements are substantially met by the commercial products Madurit MW 112 ® from Cassella AG (cf. in this connection "Kunstharze Hoechst, Technisches Merkblatt [Hoechst Synthetic Resins, Technical Data Sheet]", September 1982 edition), BC 336 ® from BIP Chemicals Limited and Resin 42 - 91 ® from Rousselot GmbH.

The reduction in the reactivity of the non-ionic melamine/formaldehyde precondensate with the water-soluble polymer ensures that the encapsulation step does not proceed unduly fast. This avoids an undesired formation of agglomerations or flocculation of relatively large particles. Agglomerations or relatively large particles cause disadvantageous phenomena, for instance, indistinct lettering, during the later printing step using the printing paper produced accordingly. Non-ionic, methylated melamine/formaldehyde precondensates of the said degree of methylation generally have the desirable reactivity and are therefore preferred within the scope of the invention. However, mixtures of non-ionic melamine/formaldehyde precondensates of different reactivity can also be used for the purposes of the invention. In individual cases, it can be advantageous to control the reactivity of the available non-ionic melamine/formaldehyde precondensate, which can be effected by adding formaldehyde.

The cationic or cationizable melamine/formaldehyde precondensate employed within the scope of the invention differs in principle from the non-ionic melamine/formaldehyde precondensate with respect to function in carrying out the process and also to the reactivity towards the water-soluble polymer. Whereas the reactivity of the non-ionic melamine/formaldehyde precondensate is reduced to an optimum degree, for example by methylation, the cationic melamine/formaldehyde precondensate must on the contrary be distinguished by a comparatively high reactivity. The active methylol groups therefore preferably have their full reactivity and are not blocked, for example by methylation. It is therefore preferably largely free of methylol ether groups, that is to say that if possible it is not partially methylated or the like. These requirements are essentially met by, for example, the commercial products Madurit MW 150 ® from Cassella AG (cf. "Kunstharze Hoechst, Technisches Merkblatt [Hoechst Synthetic Resins, Technical Data Sheet]", 1980 edition), Urecoll MP powder ® from BASF AG (cf. Technische Information [Technical Information]Ti/P 2631d) and Parez Resin 607 ® from Cyanamid GmbH (Merkblatt [Data Sheet]No. 2950-01).

The above explanations make it clear that preferably a cationic melamine/formaldehyde precondensate is used, the methylol groups of which are etherified in such a way that high reactivity towards the water-soluble polymer is ensured.

The oil, in which the color former or its acidic reaction partner, if this is a soluble compound (for example a phenolic compound), are dissolved, represents a hydrophobic material which is inert towards water. It is virtually insoluble in water or immiscible with water. A slight solubility may be disregarded. Preferred examples of oils which can, according to the invention, be utilized as solvents for the color reactants, are in particular partially hydrogenated terphenyls, chloroparaffins, alkylated biphenyls, alkylnaphthalenes, diarylmethane derivates, dibenzylbenzene derivatives, alkanes, cycloalkanes and esters such as phthalates, adipates, trimellitates and phosphates. Diverse color formers, which are described in detail in the specialist literature, can be used for dissolution in these oils and for encapsulation. Examples of these are: Lactone, phthalide, fluoran, diphenylamine, spiropyran, auramine, phenothiazine, aminophenylpyridine and amino-diazaxanthene-lactone derivatives, in particular crystal violet lactone and N-benzoyl-leucomethylene blue.

The starting materials, essential for the process according to the invention, in the form of the water-soluble polymer, the cationic melamine/formaldehyde precondensate and the non-ionic melamine/formaldehyde precondensate are employed in aqueous solution. The concentrations in which these starting materials are employed in the particular aqueous medium are immaterial. Thus, the water-soluble polymer can be chosen to be, for example, in an approximately 2 to 10% by weight solution. The range from about 4 to 5% by weight is regarded as preferred, whereas a 4.4% by weight solution is very particularly preferred. These values apply in particular to an acrylic acid/acrylamide copolymer (consisting of about 20 to 50% of acrylic acid and about 80 to 50% of acrylamide and having a molecular weight of about 400,000). Excellent results with regard to storage stability and migration resistance of the resulting microcapsules are obtained with a water-soluble product consisting of a copolymer containing about 30% of acrylic acid groups and about 70% of acrylamide groups and having a mean molecular weight of about 400,000. Unduly high concentrations of the water-soluble polymer may cause associated viscocity problems. However, these can then in turn be less important in spite of a relatively high concentration if the particular polymer has a comparatively low molecular weight. It follows from this that the particular optimum concentration of water-soluble polymers proven in practice should be determined by means of simple preliminary tests with a view to the various requirements.

The abovementioned ranges or values of percentage by weight can readily be taken as a guideline. In usual commercial products, the concentration of the cationic melamine/formaldehyde resin in aqueous solution is in general in the range from about 8 to 16% by weight, a value from about 10 to 12% by weight being preferred. This solution is slightly acidified and contains, for example, about 3 to 4% of formic acid, since melamine/formaldehyde resins of this type dissolve readily and completely only in a weakly acidic aqueous medium. Regarding the concentration of the aqueous solution of non-ionic melamine/formaldehyde precondensates, comparatively high concentrations from about 20 to 40% by weight, in particular 30% by weight, in the form of the solution to be employed, are very suitable.

The weight ratios in which the free said aqueous solutions are mixed with one another when carrying out the process according to the invention are not critical to the achievement of the underlying object. These ratios can be subject to wide fluctuations. Here again, a person skilled in the art will determine the optimum ratios as a function of the nature of the materials employed and their concentration in the particular aqueous medium by means of suitable preliminary tests without great effort. Ratios appropriate in practice can be determined from the example which follows, according to which there can be about 7.5 parts by weight of an approximately 4.5% aqueous polymer solution per 1 part by weight of an approximately 12% by weight aqueous solution of the cationic melamine/formaldehyde resin and in turn, relative to the latter, 2 parts by weight of an approximately 32% by weight aqueous solution of the non-ionic melamine/formaldehyde resin.

The weight ratio, to be applied in the process according to the invention, of water-soluble polymer to non-ionic melamine/formaldehyde precondensate, which represent the actual reactants with regard to the formation of the capsule envelope, is not critical. It is advantageously in the range from about 0.03:5 to 5:1 at that stage of the process where the reaction medium is complete with respect to the starting materials to be employed. The optimum weight ratio of water-soluble polymer to non-ionic melamine/formaldehyde precondensate depends on the particular water-soluble polymer used at the time. The number of groups with Zerewitinoff-active hydrogen atoms in the macromolecule of the water-soluble polymer plays a role here. To be exact, an equivalent figure should therefore really be stated. However, such accuracy is not necessary in carrying out the process according to the invention. Rather, the optimum ratios of the starting materials can be readily fixed by means of purely routine preliminary tests.

The explanations given above on the course of the reaction are based on general theories in aminoplast chemistry, with which a person skilled in the art is familiar.

For successfully carrying out the process according to the invention, it is essential that vigorous stirring is applied in the first two stages, that is to say in the mixing of the aqueous solution of the cationic melamine/formaldehyde precondensate and the aqueous solution of the water-soluble polymer and also in the mixing of this medium with the oil containing the color reactant in solution. This means that a high-performance dispersion apparatus must be used for mixing in order to ensure optimum turbulence and to prevent disturbing laminar conditions. Suitable information on the turbulence is given by the Reynolds number. This should preferably be above about 10,000. In practice, those types of high-performance dispersing apparatus have proven to be particularly advantageous for the purposes of the invention which are based on the stator/rotor system. This system consists of stator plates and rotor disks and also acts like a centrifugal turbine.

In one of the preferred above types of dispersing apparatus, the design is as follows: the stator plates have circles of holes, through the holes of which the material being mixed flows in the axial direction. These holes are made as recesses in annular channels arranged symmetrically on both sides of the stator plate. The flanks of these channels are provided with a special design of toothing. Shear pins likewise in an annular arrangement on the rotor disks run in the channels. The shear fields through which the material being mixed flows are alternately formed, on the one hand, by the toothed flanks of the stator channels with the longitudinal edges of the rotor pins and, on the other hand, by the end face of the rotor pins with the hole edges of the stator channels. Due to the generation of intensive high-frequency impingement, friction and shear effects, the material being mixed is continuously disintegrated into a large number of individual streams and recombined. Such multifrequency liquid mixers have a high mixing performance at short residence times and ensure exact mixing-in of small additions of a substance. While avoiding disadvantageous dead spaces, the actual volume is kept very small. High values of momentum and a strong mechanical effect lead to fine dispersion of the material even without excessively high speeds of rotation. Large contact areas in the mixing chambers ensure very intimate contact of the various components. This principle is utilized in particular by the B & L multi-frequency liquid mixer, system Pentax, type KMS 8 (speed range 500/3,500 rpm and throughput 40–800 liters/hour) and KMF 15 (speed range 500/3,500 rpm and throughput 150–3,000 liters/hour). In this case, the streams which are to be mixed are passed via two separate feed lines into the turbulence region, where they are mixed, and are passed on via an outlet line. This high-performance dispersing apparatus is outstandingly suitable for carrying out the process continuously. The same applies to the Dispax Reactor ® (marketed by Jahnke & Kunkel KG), which is based on a very similar system.

Furthermore, however, there are also types of high-performance dispersing apparatus which are suitable for batchwise operation and are likewise based on the stator/rotor system described in detail above. In this case, one of the media to be mixed is introduced first and stirred by this high-performance dispersing apparatus, and the liquid component which is to be admixed is added into the liquid cone which forms as a result of running this high-performance dispersing apparatus. Within a fraction of a second, the mixing point is drawn by the prevailing flow conditions into the turbulence zone within the high-performance dispersing apparatus and the desired dispersing takes place therein.

The types of high-performance dispersing apparatus described above are merely to be regarded as preferred examples. Of course, other types of high-performance dispersing apparatus, that is to say those based on a different principle, can also be used for the purposes of the invention, provided that they allow the same desired result of dispersing to be obtained.

In detail, the procedure when carrying out the process according to the invention, using the abovementioned starting materials, is preferably as follows: an aqueous solution of the water-soluble polymer, for example in a concentration of about 2 to 10%, preferably 4 to 5%, is mixed with an approximately 5 to 20%, preferably approximately 12% acidic (pH value about 2.5) aqueous solution of the cationic melamine/formaldehyde precondensate in a high-performance dispersing apparatus with vigorous stirring. During this mixing step, a very finely dispersed solid of a particle diameter in the micron range, in particular in the order of magnitude of about 1 micrometer, precipitates within a fraction of a second or instantaneously. This precipitation manifests itself as a turbidity. Its particular significance will be discussed in more detail below. After this mixture has been prepared from water-soluble polymer and cationic melamine/formaldehyde precondensate within a very short time, this can be followed directly, likewise with vigorous stirring by means of a high-performance dispersing apparatus of the abovementioned type, by the admixing of the hydrophobic oil phase which contains the color reactant in solution. The target diameter of the oil droplets should be between 2 and 10 micrometers, preferably between 4 and 6 micrometers. This oil droplet diameter favors consistent behavior of the color reaction systems produces by means of the microcapsules obtained, particularly in color reaction writing papers. The particular selected ratio of oil phase to the solids content of the aqueous phase is not critical. As a rule, this weight ratio is in the range from about 3.5:1 to 25:1, in particular about 5:1 to 15:1.

After or before the admixing of the oil phase, the mixture or the oil-in-water dispersion is acidified in view of the condensation reaction which proceeds during the later formation of the capsule envelope and which is catalysed by acids. For this purpose, inorganic or organic acids can be used, provided that they have sufficient acidity and do not cause any interfering side-effects, in particular do not adversely affect the color former dissolved in the hydrophobic oil. Thus, acetic acid, formic acid, citric acid, hydrochloric acid or also sulfuric acid are used preferably. The optimum pH value for the condensation reaction is in general in the weakly acidic region, in particular between 3 and 6. The region from 3.5 to 4.3 is preferred. Unduly high pH values prolong the reaction time, whereas unduly low pH values are disadvantageous under various aspects. Thus, an unduly low pH value can lead to an undesirable premature discoloration of the color former in the microcapsule. Furthermore, the condensation reaction can also proceed too fast, so that disadvantageous formation of agglomerates occurs or larger particles are formed.

The aqueous solution of the non-ionic melamine/formaldehyde pre-condensate is then stirred into the mixture prepared in the above manner. During this mixing step, it is not important to maintain particular stirring or turbulence conditions. Conventional known stirring devices are suitable. However, the said types of high-performance dispersing apparatus should not be used for this purpose, since they would interfere with the formation of the capsule envelope by the condensation reaction between the water-soluble polymer and the non-ionic melamine/formaldehyde precondensate and/or with the reaction of the non-ionic melamine/formaldehyde precondensate with itself.

The starting materials discussed above in detail are finally in the form of a reactive oil-in-water dispersion, in which the formation of the capsule envelope of the microcapsules takes place with normal stirring in the course of about 1 to 5 hours, in particular about 2 to 3 hours.

Since the condensation reaction between the water-soluble polymer and the non-ionic melamine/formaldehyde precondensate and/or the condensation reactions of the non-ionic melamine/formaldehyde precondensate with itself are accelerated by a supply of heat, it may be desirable to control or regulate the temperature of the individual process stages, for example by heating.

After the formation of the reaction medium, its temperature is in general first raised to about 55° C., in order to optimize the condensation reaction and hence the formation of the wall of the microcapsules. This step is in general almost complete after two hours' reaction at 55° C., within the abovementioned preferred ranges of the pH value. Nevertheless, qualitatively satisfactory microcapsules are usually obtained at a temperature of less than 55° C., but a longer reaction time is then necessary, as already explained. It is also possible to operate at temperatures below or even above 55° C.. The especially advantageous reaction temperature for the particular individual case can readily be determined by means of simple routine experiments.

Various additives such as, for example, an ammonium salt such as ammonium chloride, which in some cases accelerates the condensation reaction, can also be added to the reaction medium. When the condensation reaction has proceeded to the desired extent, the pH is adjusted to a neutral or weakly alkaline value by adding alkalis, in particular sodium hydroxide, potassium hydroxide or ammonium hydroxide. This largely prevents a further reaction which could lead to an agglomeration when the microcapsules are stored. Moreover, the corrosive influence of the acidic medium on the reaction vessels is eliminated. When ammonium hydroxide is used, any free formaldehyde present is largely eliminated in the form of an odorless addition compound from the reaction system.

The process according to the invention can be carried out batchwise or continuously. In the continuous procedure, for example, the mixing, carried out with a high-performance dispersing apparatus, of the aqueous solution of the polymer and of the cationic melamine/formaldehyde precondensate is followed immediately by the mixing of the oil phase containing the color reactant by means of a further high-performance dispersing apparatus and the mixture is then passed into a stirred kettle cascade in which the condensation reaction proceeds, in which case the aqueous solution of the nonionic melamine/formaldehyde precondensate can be metered into the first stirred kettle. In practice, it is also possible first to introduce the reaction mixture into a relatively large final stirred kettle. As soon as this kettle is full, the fresh reaction medium is passed into a second stirred kettle, while the reaction in the first stirred kettle is taken to completion. The finished capsule dispersion is taken off. Fresh reaction medium can then be passed in again, while the capsule-forming reaction proceeds in the second stirred kettle. This continuous process can of course be regarded only as an example. Obviously, diverse modifications are possible.

The process according to the invention can be subjected to diverse modifications without impairing the desired result, provided that, according to the invention, mixing of the water-soluble polymer with the cationic melamine/formaldehyde precondensate of the type described is carried out at the start of the process sequence, with the formation of a very fine suspension. It has been found that the very fine solid particles precipitated, produced by a direct or instantaneous reaction of the cationic melamine/formaldehyde precondensate with itself and/or a result of an interaction between the cationic melamine/formaldehyde precondensate and the polymer, are decisive for the desired stabilization. Investigations have shown that this cationic melamine/formaldehyde precondensate precipitates within a fraction of a second, the particle size being of the order of magnitude of a few micrometers and in general about one micrometer as a result of the necessary vigorous stirring by a high-performance dispersing apparatus. A largely stable suspension of very fine particles is thus obtained. Apart from these suspended particles the water-soluble polymer remains largely unchanged and dissolved in the aqueous solution.

In the further course of the process, it has been found surprisingly that precisely these very finely suspended particles effect excellent stabilization of the individual downstream systems or intermediate systems. Even in the case of disturbances of the reaction sequence, which normally require the procedure to be stopped in known processes, this very fine suspension still allows the process to be continued without problems. In the knowledge of the invention, it should have been expected that reacted cationic melamine/formaldehyde precondensate would also produce a similar effect by simple stirring into the aqueous solution of the water-soluble polymer. Surprisingly, this is not the case. Finally, it must be surprising that the very finely suspended solid particles, serving for the said stabilization, do not cause any disturbances in the further course of the process. After the end of the process, they are present in addition to the microcapsules and are utilized in the microcapsule dispersion directly for the preparation of the color reaction duplicating papers, which show no adverse effects when written on.

The particular advantages of the process according to the invention are that, in addition to the unusually advantageous stabilization of the reaction system, the desirable properties of the microcapsules are preserved. These show an unusually good imperviousness, which can be proven by conventional tests. As a result of these properties, the capsule dispersion can be applied directly to acidic acceptor papers. There are no undesired discolorations. The process according to the invention can be controlled easily and reliably. The emulsion-stabilizing effect arises within fractions of seconds. In processes of the state of the art, several hours are frequently required to achieve this.

The invention will be explained in more detail below by reference to an example.

EXAMPLE 4.3 parts by weight of an acrylic acid/acrylamide copolymer (consisting of about 30% of acrylic acid and about 70% of acrylamide) are dissolved in 45 parts by weight of water. 0.8 part by weight of cationic melamine/formaldehyde precondensate (Madurit MW 150 ®/produced by Castella AG), dissolved in 5.6 parts by weight of water with 0.3 part by weight of added formic acid, is added to this solution with vigorous stirring by means of a high-performance dispersing apparatus based on the rotor/stator principle. The solution of a color former mixture in a mixture of 12 parts by weight of chloroparaffin (chlorine content 42%, mean carbon number 17) and 12 parts by weight of dodecylbenzene (extender) are added to the above mixture, likewise with vigorous stirring by means of a high-performance dispersing apparatus. The color former consists of 0.6 part by weight of crystal violet lactone (primary color form) and 0.2 part by weight of N-benzoyl-leucomethylene blue (secondary color former). This is followed, with normal stirring, by the addition of 2.6 parts by weight of a 20% by weight aqueous solution of formic acid in order to adjust the pH value of the system to 4.2. The solution of 5.3 parts by weight of non-ionic melamine/formaldehyde precondensate (Madurit MW 112 ®) in 6 parts by weight of water is then mixed in with normal stirring. The mixture, which is at room temperature, is then slowly heated to a temperature of about 55° C.. The reaction in this system is allowed to proceed for about 2 hours. Subsequently it is cooled to room temperature. This is followed by adjusting the pH value to about 9 by adding 3.0 g of aqueous concentrated ammonia solution (25% by weight). As a result, excess formaldehyde is bound at the same time. Capsules of a mean particle size of about 4 to 7 micrometers and of high imperviousness are obtained without formation of agglomerates. When used in reaction duplicating papers, they give excellent characters.

We claim:

1. A process for microencapsulating hydrophobic oils within a microcapsule envelope in an aminoplast system, comprising the steps of:
   preparing a first acidic aqueous solution of a cationic melamine/formaldehyde precondensate and a second aqueous solution of a water-soluble polymer,
   stirring said first aqueous solution under highly turbulent conditions,
   instantaneously precipitating said cationic melamine/formaldehyde precondensate as a very fine solid suspension, by combining said first and second aqueous solutions during said highly turbulent stirring,
   adding a hydrophobic oil containing a color reactant in solution, with highly turbulent stirring, to rapidly form a stable oil-in-water dispersion of said oil,
   acidifying the oil-in-water dispersion thus obtained and adding a third aqueous solution of a water-soluble non-ionic melamine/formaldehyde precondensate, with laminar stirring, and
   condensing said non-ionic melamine/formaldehyde precondensate to form the microcapsule envelope, thereby encapsulating said dispersed oil.

2. The process as claimed in claim 1, wherein 0.05 to 1.5 parts by weight of cationic melamine/formaldehyde precondensate, based on 1 part by weight of water-soluble polymer, are mixed.

3. The process as claimed in claim 1 or 2, wherein a cationic melamine/formaldehyde precondensate is used which is free of methylol ether groups.

4. The process as claimed in claim 3, wherein the highly turbulent stirring during the mixing of said first and second aqueous solutions of the cationic melamine/formaldehyde precondensate and the water-soluble polymer is effected by a high-performance dispersing apparatus based on the rotor/stator principle, with a Reynolds Number of at least about 10,000.

5. The process as claimed in claim 1 or 2, wherein a cationic melamine/formaldehyde precondensate is used, the methylol groups of which are etherified in such a way that high reactivity towards the water-soluble polymer is obtained.

6. The process as claimed in claim 5, wherein the highly turbulent stirring during the mixing of said first and second aqueous solutions of the cationic melamine/formaldehyde precondensate and the water-soluble polymer is effected by a high-performance dispersing apparatus based on the rotor/stator principle, with a Reynolds Number of at least about 10,000.

7. The process as claimed in claim 1, wherein the non-ionic melamine/formaldehyde precondensate used is partially etherified with methanol.

8. The process as claimed in any of claims 1, 2 or 7, wherein the highly turbulent stirring during the mixing of said first and second aqueous solutions of the cationic melamine/formaldehyde precondensate and the water-soluble polymer is effected by a high-performance dispersing apparatus based on the rotor/stator principle, with a Reynolds Number of at least about 10,000.

9. A process according to claim 1, wherein substantially all of said cationic melamine precondensate is precipitated during said precipitating step within a fraction of a second, said solid precipitate has a particle diameter in the micron range wherein a stable dispersion is formed in a matter of seconds during said combining steps.

10. Microcapsules, obtainable by a process as claimed in any one of claims 1, 2, or 7.

11. Microcapsules, obtainable by a process as claimed in claim 3.

12. Microcapsules, obtainable by a process as claimed in claim 5.

13. A color reaction recording system comprising paper having at least one surface treated with microcapsules as claimed in claim 10.

14. A method of using microcapsules as claimed in any one of claims 11 or 12 in color reaction systems, comprising the steps of applying said microcapsules to at least one receiving surface and thereafter applying pressure to at least one of said microcapsules and receiving surface to induce said color reaction.

* * * * *